United States Patent [19]

Baumer

[11] Patent Number: 4,684,951

[45] Date of Patent: Aug. 4, 1987

[54] PROCESS AND APPARATUS FOR MONITORING WEATHER PHENOMENA

[76] Inventor: Hans Baumer, Buschingstrasse 43/V, 8000 Munchen 80, Fed. Rep. of Germany

[21] Appl. No.: 616,816

[22] Filed: Jun. 4, 1984

[30] Foreign Application Priority Data

Jun. 9, 1983 [DE] Fed. Rep. of Germany ....... 3320908

[51] Int. Cl.$^4$ .................... H01Q 21/24; G01S 3/02
[52] U.S. Cl. .................... 342/362; 342/361; 342/460; 342/26; 324/72
[58] Field of Search ............. 343/362, 361, 460, 5 W, 343/439, 361; 73/170 A, 170 R; 324/72, 336; 367/124, 125

[56] References Cited

U.S. PATENT DOCUMENTS

| | | | |
|---|---|---|---|
| 2,994,872 | 8/1961 | Baltzer | 343/439 |
| 3,753,117 | 8/1973 | Downing et al. | 73/170 R |
| 4,000,466 | 12/1976 | Scouten et al. | 367/125 |
| 4,106,014 | 8/1978 | Dunn | 343/361 |
| 4,159,475 | 6/1979 | Andre et al. | 343/361 |
| 4,247,821 | 1/1981 | Buselli et al. | 324/336 |
| 4,512,024 | 4/1985 | Gutleber | 343/361 |

OTHER PUBLICATIONS

Chiplonkar et al, Simultaneous Recording of Atmospherics on Four Diff. Frequency Bands in the Low Frequency Region, pp. 32–37, 1958.
Obayashi, Measured Frequency Spectra of VLF Atmospherics, pp. 41–48.

Primary Examiner—Theodore M. Blum
Assistant Examiner—D. C. Cain
Attorney, Agent, or Firm—Bacon & Thomas

[57] ABSTRACT

A process and apparatus for the day-or-night monitoring of weather phenomena by means of the analysis of the movements of air masses, wherein the movements are determined by monitoring and receiving the multiband VLF electromagnetic radiation generated in the atmosphere with directionally selective receivers. The received frequencies are then compared with values which have been correlated with atmospheric events. Means are provided for displaying the predictive results for events occurring up to 500 km away from the VLF receivers—typically updatable within seconds—in at least two stages according to the (near or far) range desired or the type of electrical polarization.

22 Claims, 7 Drawing Figures

PROCESS AND APPARATUS FOR MONITORING WEATHER PHENOMENA

BACKGROUND OF THE INVENTION

The invention concerns a process for the monitoring of weather phenomena by means of the VLF-analysis of the movements of air masses and an apparatus for the embodiment of the process.

Weather phenomena have been observed over a very long period of time by systems involving a plurality of measuring stations, which communicate their data to a center(s). From the measured data, the movements of air masses are determined and weather forecasts prepared. This known method has, however, a series of disadvantages. For example, the accuracy of the analysis of the movements of air masses is dependent not only on the type of measuring instruments, but also on the number and distribution of measuring stations. On the high seas, no measuring stations are located in the near—and often not even in the wider—vicinity from which data concerning the expected or even the prevailing weather may be obtained. The data obtained by satellites may be received only be expensive installations, and satellites by and large provide only data for broad spaces, which for travel on the high seas are inadequate and largely inaccurate. Furthermore, the frequency of readings at the measuring stations and their processing (in view of the enormous amounts of data involved) is relatively low so that up-to-date weather reports may be issued at long time intervals only.

OBJECTS OF THE INVENTION

Based on the aforementioned state of the art, it is the object of the present invention to provide a process and apparatus whereby at least certain effects of weather phenomena relevant to an observer may be monitored at any point in time, day or night, and certain expected developments predicted. Accordingly, the following benefits accrue to the use of the single-station VLF weather facility:

(1) The obtaining of predictive atmospheric data independently of location monitored.

(2) The obtaining of accurate forecasts concerning certain forms of instantaneous weather phenomena and the preparing by the comparison of several successive analyses forecasts of the weather.

(3) The observation of weather phenomena independently of the time of day, for example cyclones, at longer distances, which has been feasible heretofore only by means of satellite images and special airplanes exclusively during daylight hours.

(4) A particular advantage of the process according to the invention for the monitoring of weather phenomena in the near range is that movements of air masses without visible effects, such as cloud formation and the like, may be observed.

Further advantages will become apparent from the examples of embodiment of the apparatus for the realization of the process of the invention below.

SUMMARY OF THE INVENTION

The processes of the invention utilize the phenomenon that in the course of relative movements of air masses electromagnetic (EM) vibrations are generated, among others, in the longwave, or very low frequency (VLF), range. This electromagnetic radiation generated by weather phenomena may also be measured in a very high frequency range, but then the "natural" radiation is interfered with due to manmade, technological transmitters.

Thus, this invention consists of a process for the monitoring of weather phenomena by means of the analysis of the movements of air masses. These movements of air masses are determined by receiving the electromagnetic radiation generated in the atmosphere in the VLF range between 3 kHz and 100 kHz by means of at least one directionally selective radio receiving installation, dividing said received radiation into at least two noncontiguous frequency bands, determining the "event frequencies" occurring within the noncontiguous frequency bands separately from each other, comparing the event frequencies with standardized event-correlated values, and displaying the results in at least two stages. This process is suitable for the analysis of weather phenomena to a distance of approximately 500 km from a given location (the far range).

To implement this invention in the near range, with a distance from the location of 50-150 km, the process provides for the receiving of the EM radiation essentially polarized in the vertical direction in a frequency band of essentially 15-30 kHz in a directionally selective VLF receiving installation, determining the event frequencies which correspond to an essentially smooth wave form and high amplitude in a first segment and a lower amplitude, substantially similar to the waveform of the static term, in a second segment, and displaying said event frequency in at least two stages. Optionally, this process could entail determining the amplitudes of said event-frequency waveforms and displaying them in at least two stages as in an oscilloscope.

Further forms of embodiment of these processes and techniques according to the invention should become apparent to those of ordinary skill in the arts; e.g., the use of microprocessors, FFT analyzers, CCD detectors, color video displays in either trace of topographical form, and so forth.

BRIEF DESCRIPTION OF THE DRAWINGS

To facilitate comprehension of the present invention, part of the preferred embodiments of the apparatus for the execution of the processes according to the invention will be explained in detail with reference to the drawings, wherein.

DETAILED DESCRIPTION OF THE DRAWINGS

Figure 1:
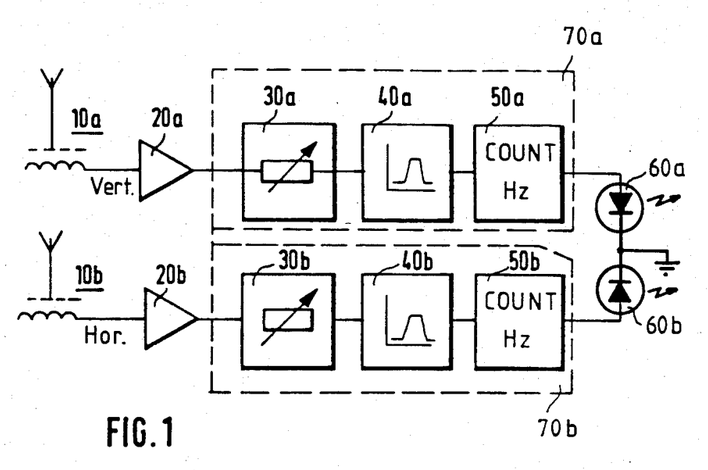
FIG. 1 shows a block diagram of an apparatus for the analysis of weather phenomena in the far range.

With reference to FIG. 1, the installation has two directionally selective antenna installations 10a, 10b, each followed in-series by the antenna preamplifier/amplifiers 20a, 20b. In this case, the first antenna 10a is aligned to receive the electrically vertically polarized EM radiation; the antenna 10b, correspondingly, to receive the electrically horizontally polarized radiation. The first antenna installation 10a is set to a frequency range of approximately 25–30 kHz and the second antenna 10b has an essentially linear receiving sensitivity in the frequency range between 3 kHz and 100 kHz. The front-end range of the first channel a is thus fully overlapped by the range of the first channel b.

The antenna installations are followed by processing channels 70a and 70b. The signals arriving from the antenna installations initially enter the equalization circuits 30a, 30b, where transmission loss may be corrected. In this simplest form of embodiment of the apparatus, the amplification or attenuation factor is adjusted manually according to the known day-night rhythm of the ranges of electromagnetic waves, which translates into either reduced or enhanced receiver sensitivity.

From the circuits 30a, 30b the signals pass to the active filter circuits 40a, 40b, wherein the signals "naturally" generated in the atmosphere are separated from those originating from man-made sources. Frequency-domain differentiation between natural and technological signals may be accomplished in a number of well known ways for both a and b channels. However, for meaningful meteorological discrimination, it is important that the electrical output of the active notch filter 40a be limited only to a positive output upon detection of the 25–30 kHz band of VLF radiation.

A number of correlative yet distinct bands may be set for the horizontal-input detection on the b channel. For purposes of this simplified embodiment, the 9.2–10.7 kHz band has been selected to condition the signal output of filter 40b. Other frequency notches are possible as will be disclosed later in the preferred and more comprehensive embodiment.

Event frequencies are determined in the next stage of signal processing. Still in reference to FIG. 1, the filtered signals on channel a proceed to logical counting circuit 50a; those of channel b, to 50b. When the proper frequencies, or frequency bursts, are passed through the filters 40a and 40b, and when they occur in countable fashion over predetermined intervals of time in the circuits 50a and 50b sufficient to cause a positive output in either or both (c.2.5 bursts per second), these natural frequencies are thereby known as event frequencies. In other words, event frequencies cause positive electrical activity in processing channels 70a and/or 70b.

Empirical evidence has shown, for example, that for the two frequency notches referred to in FIG. 1, event frequencies occurring therein may be directly correlated to real-time meteorological events, especially approaching fronts. The following abbreviated table shows this correlation vis-a-vis the corresponding activity of the processing circuits 70a and 70b and their respective LED indicators 60a and 60b:

TABLE 1

| PHENOMENON | POLARIZED VLF BANDS | Bursts/ Second | LED 60a | LED 60b |
| --- | --- | --- | --- | --- |
| Warm Front Approaching | 9.2–10.7 kHz horizontal | 2.5 | OFF | ON |
| Cold Front Approaching | 25–30 kHz vertical | 2.5 | ON | OFF |
| Cold Front Approaching Gradually | 9.2–10.7 kHz horizontal 25–30 kHz vertical | 2.5 | ON | ON |

Therefore, by this rudimentary two-LED approach, these event frequencies can be "displayed" on two indication levels by their detected effects either singly or concomitantly, and useful atmospheric information may be obtained at one receiving station. These meterological findings may also be correlated or compared in equivalent detection/display arrangements.

Obviously, these indications are valid only for the directions in which the two antennas 10a, 10b are aligned during the measurements. In order to be able to provide information concerning weather phenomena fully around the immediate location, it would be necessary to receive and process the electromagnetic radiation in all the directions of interest either simultaneously or successively. This may be effectuated either by individual moving antennas or through phased-array technology or with arrangements of several antennas aligned in different directions and queried in succession. Such an antenna installation of the latter type is shown schematically in FIG. 2; it consists of separate ferrite antennas 11 with directional shielding 12 suitable to receive horizontally or vertically polarized EM waves. (Polarization direction is herein understood to be the direction of the electric field vector.) To receive vertically polarized waves, the ferrite antennas are aligned horizontally, and to receive horizontally polarized waves, vertically.

Figure 2:
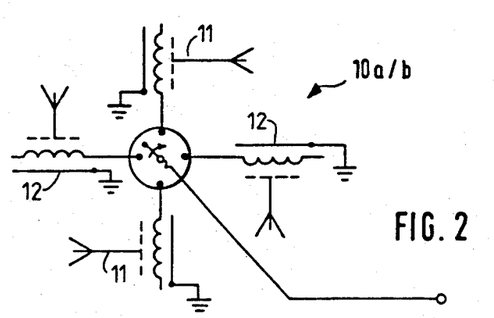
FIG. 2 a schematic view of the antenna installations.

Naturally, it is possible to use other antenna installations in place of the aforedescribed ferrite antennas 11, provided they are suitable for the frequency range involved. A great number of antenna arrays of this type are known in principle in the technology of direction-finding. If more accurate homing results are desired, goniometer-type direction finders with stationary antennas may typically be used, whereby high resolution direction-finding is effected by means of electric differential transformer circuits.

Figure 3:
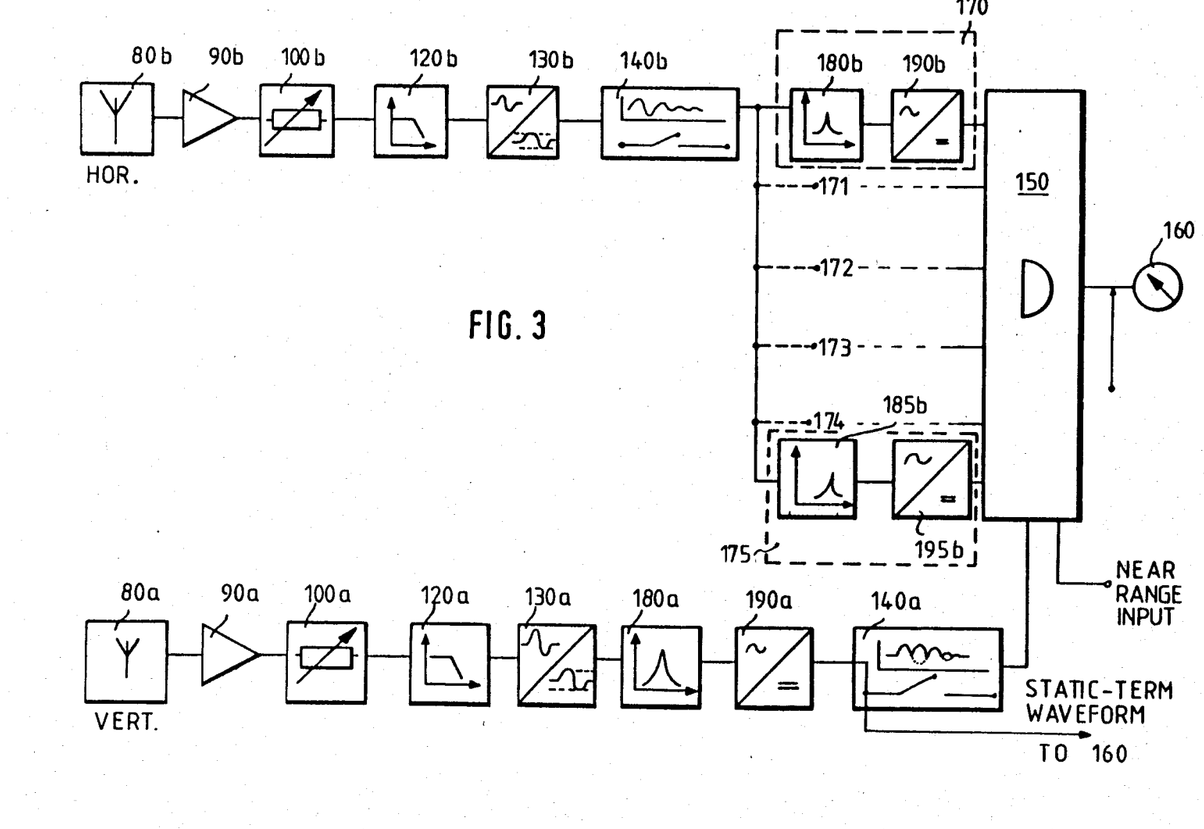
FIG. 3 a preferred form of the apparatus for the analysis of weather phenomena in the far range.

Now with reference to FIG. 3, the preferred embodiment of the apparatus according to the invention is disclosed. As above, two antenna installations 80a and 80b with (pre-)amplifiers 90a and 90b and variable attenuation/amplifier elements 100a and 100b are provided. The antenna 80a is set for the reception of vertically polarized waves and the antenna 80b for the reception of horizontally polarized waves. As with the front-end circuit of channel a in FIG. 1, it would similarly be useful to select the analog design parameters of 80a, 90a, and 100a to tune-in only the narrow 25–30 kHz VLF band.

Next, the incident signals are conducted to the low-pass filter 120b, the upper cut-off frequency whereof for operation in the Federal Republic of Germany is approximately 55 kHz. The upper cut-off frequency of the lowpass filter (LPF) 120b is chosen so that interference and noise from the nearest man-made transmitter may be screened-out. Depending on the location, different cut-off frequencies may be necessary or possible. For redundant quality assurance, a corresponding LPF 120a may be placed in the vertical a channel as shown. In any case, amplitude-limiter (clipping) circuits 130a and 130b are subsequently provided for both channels so as to avoid overmodulating the succeeding processing circuitry.

In channel b for the horizontally polarized VLF vibrations, an active filter circuit 140b for distinguishing between natural and technological radiation waveforms (as shown) follows the limiter 130b. Accordingly, this circuit, which may equivalently be a subchannelized processor, will only switch-through, amplify or regenerate signals associated with "smooth" sinusoidal waveforms of the type not generated by technological sources such as electric motors, arcing contacts, etc.

The output of active filter 140b proceeds to a plurality of parallel processing channels 170 to 175 each of which comprises, in series, a unique bandpass filter 180b to 185b and a corresponding arithmetic circuit 190b to 195b to form the absolute value of the output signals. The individual bandpass filters preferably are set for the following VLF notches: 3.5–4.5 kHz, 5.5–6.5 kHz, 7.5–8.5 kHz, 9.2–10.7 kHz, 11.5–12.5 kHz and 45–55 kHz. The results of the processing channels 170 to 175 are respectively displayed on a screen or in an LED array 160 after proceeding through logic network 150.

In processing channel a for the vertically polarized electromagnetic vibrations, the bandpass filter 180a is arranged after the limiter 130a; the filter is preferably set to a frequency band of 25–30 kHz, which in this case coincides with front-end sensitivity. Following the bandpass filter 180a, the arithmetic circuit 190a is arranged wherein the absolute value (effective value) of the incoming potential is formulated. Circuits of this type are well known from the technology of measurement instrumentation, and the simplest form is representable by a full-wave rectifier.

Following the absolute-value former 190a, the signal passes into a processing active filter 140a wherein the signals are separated according to three contingencies: If an incoming interference signal of a technological emitter (switching pulses, electric motors, etc.) is present, it is completely blocked (shorted to ground). In the case of a vibration extending essentially in sinusoidal form over at least one complete oscillation, this indicates a vertically polarized pulse from the far range is present, and a positive output is passed to the correlating logic circuit 150 for combination with the other signals from b channel. If, however, a form of vibration is received, which is correspondingly approximate in its waveform to the "static term," i.e., consisting of a first segment of high amplitude and a second, longer segment with a lower amplitude, that signal is not switched-through, regenerated or amplified to the logic circuit 150 nor to the display device 160.

For another form of embodiment (not shown) of the invention essentially disclosed in FIG. 3, in place of the plurality of processing channels 170 to 175, an FFT analyzer may be provided, which performs by means of CCD circuits a Fourier transform, thereby converting the signals from the time mode to the frequency mode. Results could be stored in a digital memory, wherein each memory address is associated with a certain frequency. The content of any address then corresponds to the burst, or pulse-sequence, frequency of the signal received. Further processing may then be implemented by other means, wherein it is extremely advantageous to continue operating in the digital mode.

In the manner of Table 1 above and with reference to the VLF notch filters 180b to 185b, Table 2 has been prepared to show an expanded version of frequency-to-atmospheric-event empirical correlation. The critical event frequencies are identified or detected in the processing channels 170 to 175 and 180a/190a, but they are made meaningful for meterological purposes in the logic network 150 where these signals are mutually compared. This network is further delineated in FIG. 5 as consisting typically of a plurality of AND-gates and inverters; other equivalent networks of course are possible. It is stipulated that a signal in a certain frequency band is evaluated as "not occurring" when it is at a pulse frequency of less than 2.5 Hz and as "occurring" if it exceeds a burst/pulse frequency of 2.5 Hz. For the sake of simplicity, the VLF frequency bands are designated only by their mean frequencies in FIG. 5. The output signals of the logic network 150 have been labeled A0 to A9. These can easily be visualized as input signals for corresponding LED elements in an appropriate display 160, but in any event, they may be interpreted as follows:

TABLE 2

Figure 5:
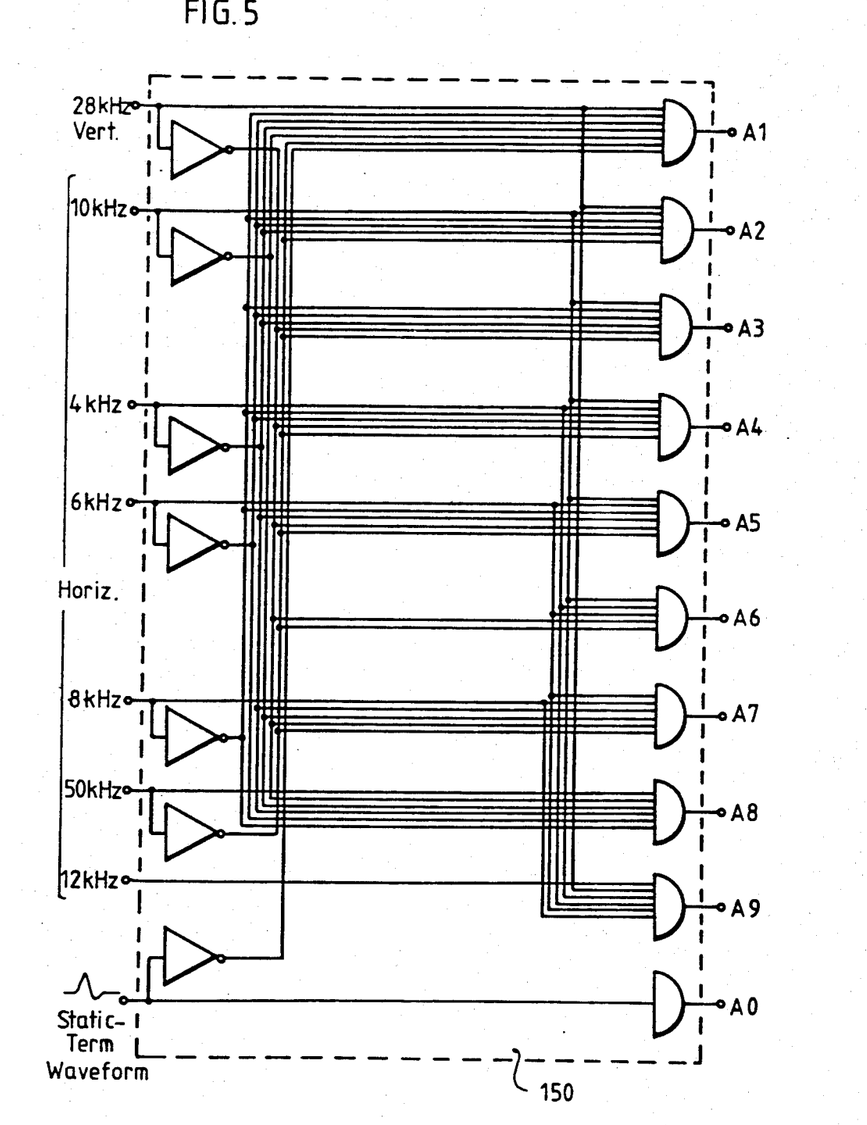
FIG. 5 a preferred form of a logic circuit used in FIG. 3 for the analysis of weather phenomena.

| PHENOMENON | POLARIZED VLF BANDS (kHz) | BURSTS/ SECOND | ACTIVE OUTPUT |
| --- | --- | --- | --- |
| Cold Front Approaching | 25–30 Vertical | 2.5 | A1 |
| Cold Front Approaching Gradually | 25–30 Vertical<br>9.2–10.7 Horizontal | 2.5 | A2 |
| Warm Front Approaching Gradually | 9.2–10.7 Horizontal | 2.5 | A3 |
| Warm-Air Advection, Cyclones, Tornadoes, Hurricanes, Lows | 3.5–4.5 Horizontal<br>9.2–10.7 Horizontal | 2.5 | A4 |
| Cold-Air Convection or Stabilizing Weather Pattern | 5.5–6.5 Horizontal<br>9.2–10.7 Horizontal | 2.5 | A5 |
| Enhanced Stabilizing Trend | 3.5–4.5 Horizontal<br>9.2–10.7 Horizontal<br>11.5–12.5 Horizontal | 2.5 | A6 |
| Formation of Dry Strata, Inversions, and Double Inversions | 5.5–6.5 Horizontal<br>7.5–8.5 Horizontal | 2.5 | A7 |
| Reverse Side Position; Cyclones Clearing Off | 45–55 Horizontal | 2.5 | A8 |
| Thunderstorms; Lightning Flashes | 25–30 Vertical<br>3.5–4.5 Horizontal<br>5.5–6.5 Horizontal<br>7.5–8.5 Horizontal<br>9.2–10.7 Horizontal<br>11.5–12.5 Horizontal | 2.5 | A9 |
| Change in Ground Conditions (Fog) or Vertical Airflows in Immediate Area; Static Term | 15–30 Vertical | 2.5 | A0 |

TABLE 2-continued

| PHENOMENON | POLARIZED VLF BANDS (kHz) | BURSTS/ SECOND | ACTIVE OUTPUT |
|---|---|---|---|
| (Optional for FIGS. 3 & 5) | | | |

As indicated in FIG. 5 and the table above, it could be useful to incorporate detecting and indicating means for near-range weather effects (around the receiving-station area) into the foregoing embodiments of this invention. Such an enhancement for the determination of weather phenomena in the near range is explained in more detail with reference to FIG. 4, where a directionally selective antenna installation 205, set for the reception of vertically polarized VLF radiation in the band 15-30 kHz, is followed by a preamplifier 215, a variable attenuating element 225 (amplifier with adjustable amplification), and a lowpass filter 230 with an upper limiting frequency of 55 kHz (preferably 30 kHz). The signals from the lowpass filter 230 are sent to the amplitude limiter 235, and then to the bandpass filter 240 which is set to a frequency band of 15-30 kHz, and next to an absolute-value former 245 (in the simplest case a full-wave rectifier). From there, signals pass into a switching processor (active filter) 250 for the division of the signal path in keeping with the type of the signal received. This device is similar to the circuit 140b in FIG. 3, for they both perform the separation of EM vibrations based on their shape, and thus the elimination of technologically generated interference signals is accomplished (possibly with the aid of microprocessors, wherein the signals are stored for a certain period of time, corresponding approximately to 3 to 4 complete oscillations or bursts, and then subjected to digital pattern recognition by means of a microprocessor).

The use of microprocessors is especially advantageous if the display of measured results is to be rendered pictorially on an image screen. The alignment of the antenna could then be controlled by that microprocessor, thereby providing displays resembling weather maps. Here the different data may be displayed for example in different colors to achieve greater clarity.

Figure 4:
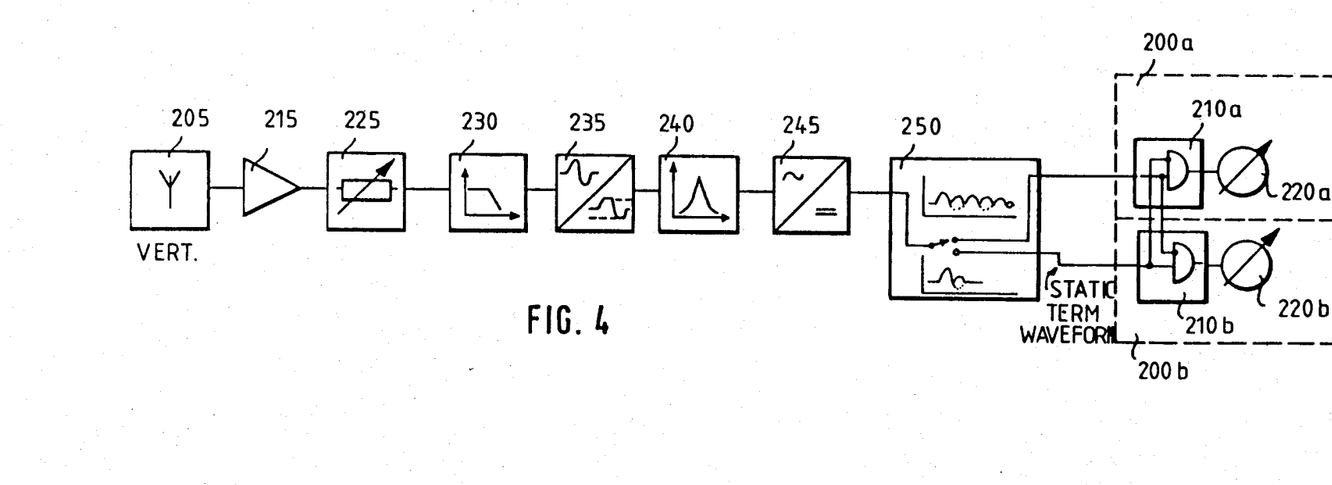
FIG. 4 a preferred form of the apparatus for the determination of weather phenomena in the near range.

Following the circuit 250 in FIG. 4, the signal path branches into two processing channels 200a and 200b which comprise respective AND-type/counter logic circuits 210a and 210b wherein the received frequencies of the events taking place are continuously counted over a definite period of time (i.e., c. 2.5 bursts/sec.) and mutually correlated for display or alarm purposes.

The logic circuits 210a and 210b are connected with the display circuits 220a and 220b, where the event frequencies are displayed by virtue of the waveforms "recognized" in element 250 as shown.

From the values of the event frequencies of the signals from the near range read on the display 220a and 220b, vertical airflows may be detected with certainty within a radius of up to 50 km—often to 150 km. Vertical airflows of this type occur for example when ground fog is beginning to lift at approximately 15-20 minutes before that lifting becomes optically recognizable.

In a further embodiment of the apparatuses according to the invention (i.e., the combining of FIGS. 3, 4, and 5), for the evaluation of weather phenomena in both the near and the far ranges, means could be provided in all of the processing channels for the different frequency bands to determine and display the mean amplitudes of the results received. From these results, conclusions relating to the velocity of changes in weather phenomena and the velocity of the movement of weather fronts may be derived.

Figure 6:
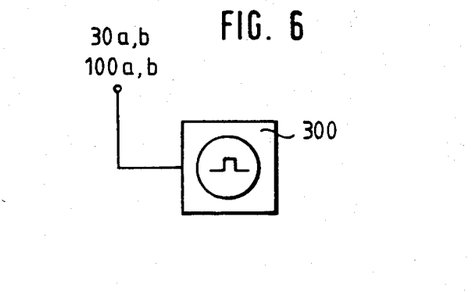
FIG. 6 a timer circuit for the compensation of environmentally caused fluctuations of receiver sensitivity.

As described above, in all of the forms of embodiment of the devices according to the invention, variable attentuation/amplification elements are installed in the front-ends of each receiver. Preferably, these attenuating/amplifying elements 30a, 30b and 100a, 100b could be designed so that the attenuation or amplification factor can be adjusted by means of electric signals (not manually). FIG. 6 shows an apparatus comprising a timer 300 which switches in a 24-hour cycle the attenuation elements 30a, 30b and 100a, 100b to higher or lower attenuation levels. This timer 300 compensates for the known day-night effects, which cause in the daytime a higher, and at night a lower, attenuation of EM vibrations in the atmosphere. It is assured in this manner that the apparatus is operating essentially independently of the solar-affected receiving conditions.

Figure 7:
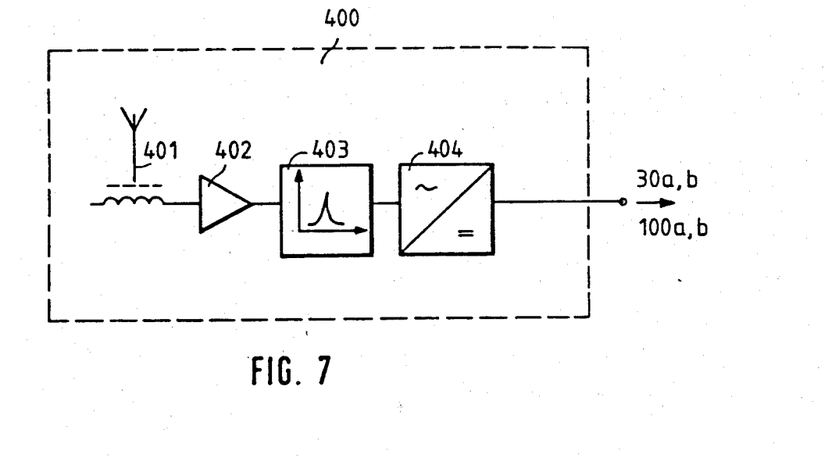
FIG. 7 a field-strength compensating circuit intended to optimize receiver sensitivity.

In another version of this attenuation compensator, receiving conditions are controlled, not in keeping with the empirical values of day-night fluctuations, but directly by prevailing conditions. For this purpose, an apparatus 400 according to FIG. 7 is appropriate; it comprises an antenna 401, an amplifier 402, a bandpass filter 403, and an in-series absolute-value former 404. The circuit 400 thus corresponds to a field-strength measuring instrument, which in keeping with the state of the art could be developed much more elaborately. This field-strength measuring instrument 400 is set to the transmitting frequency of a standard device emitting in the longwave range which is not located in the immediate vicinity of the weather-measuring VLF receiver. (In the Federal Republic of Germany for example, the Maiflingen time station is suitable for this purpose; it emits a frequency of 77.5 kHz.) If the measuring location is stationary, all field-strength fluctuations correspond exactly to the receiving conditions determined by the atmosphere so that the amplification of the attenuators 30a, 30b and 100a, 100b may be controlled inverse-proportionally to the field strength.

It may be seen from the above that the devices for the embodiment of the process according to the invention contain a plurality of known structural elements which, however, are combined in a novel and nonobvious manner. It follows that a series of circuits, explained herein only be means of block diagrams, may be established with either analog or digital modules.

This process is applicable to many fields, and the devices of its embodiment are advantageously constructed in a modular manner so that, corresponding to the measured results formulated, fewer or more numerous measuring channels, accurate or less accurate indications, etc. are optional.

The determination of the movements of air masses in the near range makes it possible to forecast the appearance and lifting of smog-type phenomena. Based on such results, it would therefore be possible to recognize the natural self-purification ability of the air and thus to provide indications for the placement of heavily polluting industries.

With the aid of the analysis of VLF signals from the near range, airflows may be recognized in clear air, which is advantageous for example in the monitoring of air traffic around airports.

By the application of the processes according to this invention at sea, it would be possible to avoid approaching weather fronts and to effect precautionary measures. Furthermore, the processes may be applied with great advantage (on ships) to the evaluation of wind conditions to be expected; by locating high and low pressure areas it is possible to predict the most favorable course.

A particularly attractive application of the processes according to this invention is presented by the need of providing forewarnings in tornado areas in order to keep the damage as low as possible. In particular, it is important to be able to observe the direction of travel of tornadoes both day and night so that even larger metropolitan areas may be evacuated in time.

In conformance with the foregoing disclosure, I claim:

1. A process for the monitoring of weather phenomena by means of analysis of movements of air masses whereby said movements are determined by
   (a) receiving the EM radiation generated in the atmosphere in the frequency range between 3kHz and 100kHz by means of at least one directionally selective VLF receiving antenna installation,
   (b) splitting said radiation into essentially two non-contiguous frequency bands,
   (c) determining separately the atmospheric event frequencies occurring within said frequency bands,
   (d) comparing these event frequencies with each other, and
   (e) displaying the result using at least two indication levels indicating the presence of said atmospheric event frequencies.

2. A process according to claim 1 whereby the received VLF radiation is split into the two frequency bands of 9.2-10.7 kHz and 25-30 kHz, and whereby the received VLF radiation is further split with respect to the directions of EM polarization establishing a division into horizontal and vertical components whereby the frequency band of 25-30 kHz is channelized with the vertically polarized component of the VLF radiation and the frequency band of 9.2-10.7 kHz is channelized with the horizontally polarized component.

3. A process according to claim 2 wherein the frequency band of 25-30 kHz is channelized with the vertically polarized component of the VLF radiation and the frequency bands of 3.5-4.5 kHz, 5.5-6.5 kHz, 7.5-8.5 kHz, 9.2-10-7 kHz, 11.5-12.5 kHz, and 45-55 kHz are channelized in parallel with the horizontally polarized component.

4. A process according to claim 2 wherein the receiving sensitivity of the VLF receiving installation changes between one of at least two attenuation levels corresponding to known day-night effects on EM radiation attenuation.

5. A process according to claim 4 wherein the measured field strength of a known yet remote independent longwave transmitter is used to control the sensitivity of the VLF receiving installation essentially in a manner which is independent of the day-night effects on EM attenuation.

6. A process according to claim 2 wherein the amplitudes of the event frequencies are determined and displayed as at least two stages indication levels.

7. A process according to claim 2 wherein VLF interference signals from man-made, technological transmitters (sources) are separated from the received event frequencies by means of form and/or duration analysis of waveforms.

8. A process according to claim 2 or 3 whereby the received vertically polarized VLF radiation in the frequency band of 25-30 kHz is further discriminated depending on whether the detected waveform is essentially sinusoidal over at least one complete oscillation or whether it has the smooth asymmetrical shape of a static-term waveform; namely, a high amplitude in a first segment thereof and a lower and perhaps inverted amplitude in the second segment; and whereby both types of discriminated waveforms may be separately displayed.

9. A process for the monitoring of weather phenomena by means of the analysis of movements of air masses in the near range (up to a distance of 150 km from the measuring station) whereby said movements are determined by
   (a) receiving the vertically polarized EM radiation in the atmosphere which is essentially in the frequency band of 15-30 kHz by means of a directionally selective VLF receiving installation,
   (b) determining the event frequencies and discriminating them from static-term waveforms, which are essentially smooth and with the first segment of high amplitude and any lower amplitude in a second segment of the waveform,
   (c) determining the amplitude of said received VLF waveforms, and
   (d) displaying the event frequencies and the static-term waveforms as at least two indication levels.

10. A process according to claim 9 whereby the receiving sensitivity of the VLF receiving installation is controlled in at least two degrees of attenuation corresponding to the known day-night effects on the range of EM radiation in the atmosphere.

11. A process according to claim 9 wherein the measured field strength of a known yet remote independent VLF transmitter is used to control said receiving installation's EM sensitivity in a manner which is independent of the day-night attenuation phenomena of EM transmissions.

12. A process according to claim 9 whereby intefer-ence signals from man-made, technological transmitters (sources) are separated from the received event frequencies on the basis of form and/or duration analysis of waveforms.

13. An apparatus for monitoring weather phenomenon by analyzing movements of air masses, comprising:
   (a) at least two directionally selective antenna installations wherein the first antenna installation is set to receive vertically polarized EM radiation in the frequency band of 25-30 kHz and the second antenna installation is set to receive horizontally polarized EM radiation in a frequency band of 3-100 kHz,
   (b) at least two antenna-corresponding (pre-)amplifiers,
   (c) at least two parallel processing channels associated with the two antenna installations, each comprising at least one variable attenuator/amplifier, circuits for the suppression of interference signals form technological sources, and logic circuits for the determination of the event frequencies, and
   (d) a display means.

14. A processing channel according to claim 13 wherein the frequency band for the horizontally polarized EM radiation is configured for 9.2–10.7 kHz by means of a bandpass filter means.

15. Apparatus according to claim 13 or 14 wherein the antenna installations have the configuration of a crossed loop in the form of orthogonal groupings of four multipled ferrite antennas.

16. Apparatus according to claim 14 wherein the antenna installation for receiving the vertically polarized EM radiation is set to a frequency band of 25–30 kHz and is provided with a corresponding bandpass filter, and the antenna installation for receiving the horizontally polarized EM radiation is set for the entire VLF frequency range with an essentially constant receiving capacity.

17. Apparatus according to claim 13 wherein the processing channel for the horizontally polarized EM radiation is divided after the attenuator/amplifier into parallel bandpass-and-absolute-value channels for the frequency notches 3.5–4.5 kHz, 5.5–6.5 kHz, 7.5–8.5 kHz, 9.2–10.7 kHz, 11.5–12.5 kHz, and 45–55 kHz, and wherein each processing channel has at least one lowpass filter with a cut-off frequency of 55 kHz followed by an in-series amplitude limiter means.

18. Apparatus according to claim 13 or 17 wherein is further provided for the vertically polarized processing channel a circuit with successive secondary channels for the distinction between VLF radiation from the far range and VLF radiation from the near range, wherein said secondary channels are equipped with logic circuits and associated display circuits whereby the display of signals, according to amplitude or waveform, generated by simultaneous events from both the near and far range is prevented.

19. Apparatus for the embodiment of the process according to claim 9 wherein at least one directionally selective antenna and amplifier are set to receive vertically polarized EM radiation in the frequency band of 15–30 kHz, and wherein a processing channel is associated with said antenna comprising an attenuator/amplifier with amplification variable in at least two stages, a circuit for the suppression of interference signals from technological sources, a logic circuit for the determination of event frequencies, and a display circuit for the display of the results determined.

20. Apparatus according to claim 19 wherein the antenna has the configuration of a crossed loop of four multipled ferrite atennas, of which two are always arranged at an angle of 90° with respect to each other and are set to receive a frequency band of 15–30 kHz, and wherein the processing channel has
   (a) a lowpass filter with an upper cut-off frequency of 55 kHz, followed by
   (b) an amplitude-limiter circuit, followed by
   (c) a bandpass filter (15–30 kHz), followed by
   (d) a full-wave rectifier (absolute-value) circuit, followed by
   (e) a circuit with successive secondary parallel channels for distinguishing between VLF radiation from the far range and VLF radiation from the near range, wherein said secondary channels have logic channels for the determination of the detected event frequencies and have corresponding display circuits which are interconnected so as to prevent the display of amplitude signals of simultaneous events from both the near and far range.

21. Apparatus according to claims 13, 16, 17 or 19 wherein the control of the antenna-amplifier gain is switchable in accordance with a clock generator, the output signal whereof is synchronized with the day-night cycle of fluctuations in the range of transmitted EM radiation.

22. Apparatus according to claims 13, 16, 17 or 19 wherein control of the antenna-amplifier gain is accomplished by a connected field-strength measuring instrument, the output signal whereof corresponds to the field strength of a physically remote VLF standard transmitter operating in an adjacent frequency band(s).

* * * * *